Aug. 8, 1939.　　　　　G. AUER　　　　　2,169,086

PIPE STILL

Filed Aug. 7, 1937

INVENTOR
Gustavus Auer,
BY
Beau, Brooks, Buckley & Beau
ATTORNEYS

Patented Aug. 8, 1939

2,169,086

UNITED STATES PATENT OFFICE 2,169,086

PIPE STILL

Gustavus Auer, Snyder, N. Y.

Application August 7, 1937, Serial No. 157,956

4 Claims. (Cl. 196—110)

This invention relates to the design, construction and operation of tubular furnaces and more particularly to that type of furnace known as a pipe still.

Stills or furnaces in this classification are a type of heat exchange apparatus in which the fluid being heated is passed through tubes or pipes of substantial diameter and length and are subjected during their passage to the effect of heat generated in the combustion space of the furnace. The arrangement of the tubes may be such as to obtain series flow through a single tube or parallel flow by connecting two or three tubes at their terminals.

In general, the broad application of the invention is to an improved form of heat exchange apparatus in which there is thermal interchange between fluids, one of which is passed through the tubes and the other is caused to flow over the external surfaces, thereof transferring heat thereto by radiation, convection and conduction. In transferring heat from a fluid to a solid with which it is in contact there is strong evidence to indicate the presence of an adhering, relatively stationary film of fluid on the surface of the solid, which becomes thinner as the velocity of the fluid increases but which breaks away from the solid only at very high velocity of the gas passing over the solid. Through such a film, heat may be transmitted by conduction only, although once the heat has penetrated the film the hot molecules of the fluid film are picked up and carried away mechanically by the main body of the fluid and then the transfer is mainly a matter of convection, and in the latter case the resistance to flow will be negligible. In the operation of pipe stills gases flow at right angles to the pipes and the greater the velocity of the movement of heated gas, the greater is the rate of heat transfer.

It is an object of the present invention to provide a construction for pipe stills permitting a close packing of the tubes, thereby inducing relatively higher velocities of the heated gases passing at right angles to the tubes and thus increasing the over-all efficiency of a particular installation or in the alternative permitting the same output from a smaller installation.

It will be seen, therefore, that the present invention makes possible the construction of a pipe still with a given capacity at relatively lesser cost than has been possible heretofore, particularly in view of the fact that the construction materials of the still and particularly the tubes are of relatively expensive metal.

Referring more particularly to the drawing.

Figure 1:
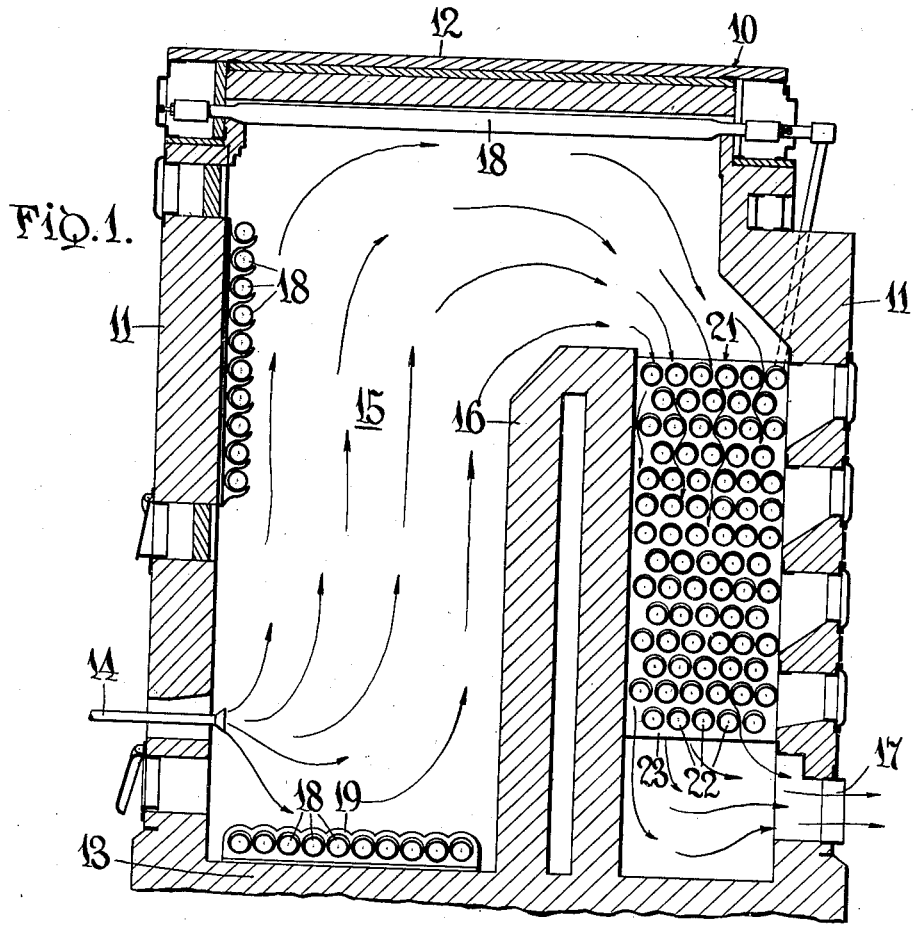
Fig. 1 is a sectional view of the pipe still of the present invention.

Referring more particularly to the drawing, the furnace is shown at 10 having side walls 11 faced upon the interior with several courses of fire brick, upon the exterior with several courses of common brick with an intermediate layer of insulating brick and having a top 12 and bottom 13 adapted to resist extremely high temperatures.

The furnace is provided with a burner 14 of conventional design for burning combustible material of either solid or fluid form and a combustion chamber 15 is formed within the furnace between one of the side walls and a bridge wall 16 intermediate the side walls. An exit port 17 is also provided in the furnace for withdrawing hot products of combustion generated at the burner.

So-called radiant tubes 18 are supported upon the bottom of the furnace in supporting members 19 which maintain the tubes in their relative horizontal position and substantially parallel to one another, but permit movement along the support due to lineal expansion. Radiant tubes are also supported upon the side walls and hung from the top. As shown, these tubes are generally in a single course rather than in a bank, although a plurality of courses may, under certain conditions, be employed.

Between a side wall 11 and the bridge wall 16 is positioned a plurality of tubes 22 in a bank forming the convection tube bank 21, tubes 22 being positioned substantially horizontally and parallel to one another and closely packed in a fashion to be pointed out more clearly hereinafter. From the position of the tube bank in the furnace it will be seen that products of combustion generated at burner 14 are forced upwardly through combustion chamber 15 across bridge wall 16, and downwardly through the bank of convection tubes 21 substantially at right angles thereto and discharged through flue 17. As pointed out above, in the transfer of heat from a fluid to a solid by convection, closer spacing of the tubes results in increased velocity of gases passing over the tubes with a resultant increase in rate of heat transfer. However, close spacing of convection tubes of a pipe still which are generally from 3 to 7 inches in diameter, is materially restricted for the reason that the tubes are connected at their ends by return bends, the spacing being determined by the radius of the permissible bend. By decreasing the radius, therefore, of the bend in accordance with the present invention closer packing is obtained.

Figure 2:
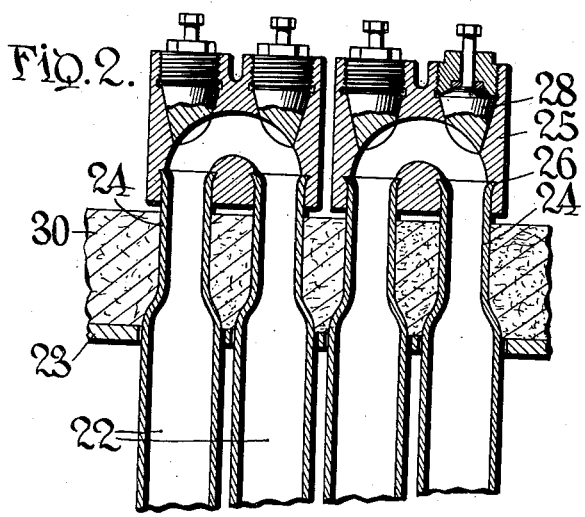
Fig. 2 is an enlarged fragmentary section showing a plurality of the pipes assembled with a tube support member.
Figure 3:
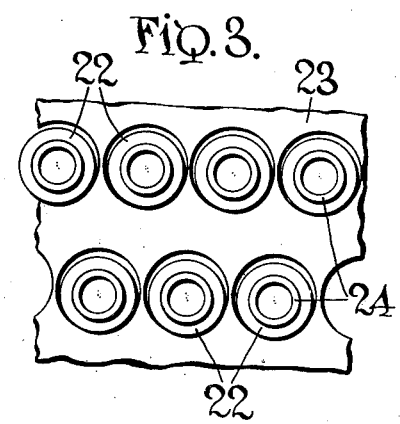
Fig. 3 is a fragmentary end elevational view of a tube sheet taken externally with tubes in position but with the end connectors for the tubes and the tube sheet insulation removed for clearness.

In Fig. 2 there is shown enlarged, a form of packing permitting the employment of a considerably greater number of tubes in a furnace of given dimensions than has been heretofore realized. To this end, therefore, there is placed adjacent each end of the bank of convection tubes 21, relatively fixed supporting members 23 within the furnace extending substantially from bridge wall 16 to side wall 11 of the furnace. The convection tubes are supported upon this member in loose fashion permitting relative movement between the relatively fixed supporting member 23 and the tubes 22 due to lineal expansion of the tubes upon heating thereof, as clearly shown slightly exaggerated in Fig. 3. Reduced ends 24 are formed upon tubes 22 as by swaging, welding or in any other convenient fashion.

By reducing the diameter of the tubes at their ends, as, for instance, from six inches to 4 inches, closer packing can be obtained and the tubes may be packed on 7 inch centers with a material increase in heat transfer. As shown in Fig. 2 adjacent tubes are connected at their ends with a return bend connection 25, the terminal portions 26 of the reduced ends 24 being rolled into the return bend or connected thereto in any convenient fashion. To permit access to the tubes, removable fittings are seated within the return bends in substantial registry with the tubes. The form of fitting shown comprises a guard seat 28 fitting tightly within the guard port in the return bend, the seat being pressed to produce a tight fit by virtue of the exteriorly threaded collar contacting with the interior threads of the return bend.

Heat loss is mantained at a minimum by placing heat-insulating material 30 upon the side of support member 23 removed from the heating medium.

From the foregoing it will be seen that the present invention provides a tubular furnace construction of enhanced efficiency due to the closer packing of tubes permitted by reducing the ends of the tubes to accommodate return bends having a small radius.

What is claimed is:

1. In distillation apparatus for use in treating hydrocarbon oils, a heat transfer apparatus comprising a relatively stationary tube sheet, a heating zone upon one side of said sheet, a plurality of tubes in said heating zone and supported by said tube sheet and movable with respect thereto, reduced ends attached to said tubes and positioned upon the side of said tube sheet away from said heating zone, and a return bend removably attached to a plurality of the reduced ends and producing fluid communication between a plurality of tubes.

2. In distillation apparatus for use in treating hydrocarbon oils, a heat transfer apparatus comprising a plurality of relatively fixed tube sheets, a heating zone between the tube sheets, a plurality of tubes supported by and extending between said tube sheets and movable with respect thereto, reduced ends attached to said tubes on opposed sides of said tube sheets, and a return bend removably attached to a plurality of the reduced ends producing fluid communication between a plurality of tubes.

3. In distillation apparatus for use in treating hydrocarbon oils, heat transfer apparatus comprising a heated chamber, a pair of spaced tube sheets therein having openings for receiving and supporting a plurality of tubular heat exchange elements, tubular elements supported in said tube sheets adjacent their opposite end portions and terminating at their opposite ends in portions of substantially reduced diameter, said portions of reduced diameter lying outside of said tube sheets, the portions of said tubular elements supported by said tube sheets being of full diameter and the openings in said tube sheets being larger than the full diameter of said tubular elements whereby said tubes may expand freely and whereby said tubular elements may be placed in position and removed freely from the outside of either tube sheet without disassembly of said tube sheets and whereby the entire extent of said tubular elements between said tube sheets is of the full diameter of said tubular elements.

4. In distillation apparatus for use in treating hydrocarbon oils, heat transfer apparatus comprising a plurality of horizontally extending fluid conducting tubular elements, spaced tube supporting sheets having aligned openings for giving spaced support to said tubular elements, opposite terminal portions of each of said tubular elements having a diameter less than the diameter of the intermediate portion of said element with such portions of reduced diameter lying wholly without said tube sheets whereby tubular elements may be placed in position with respect to said tube sheets without effecting disassembly of the latter and whereby the diameter of said tubular elements is substantially constant and unreduced in their extent between said spaced tube sheets.

GUSTAVUS AUER.